US006324562B1

(12) United States Patent
Inagaki et al.

(10) Patent No.: US 6,324,562 B1
(45) Date of Patent: *Nov. 27, 2001

(54) INFORMATION PROCESSING APPARATUS, MULTITASK CONTROL METHOD, AND PROGRAM RECORDING MEDIUM

(75) Inventors: Hidehiro Inagaki, Kawasaki; Satoshi Kasai, Ishikawa, both of (JP)

(73) Assignees: Fujitsu Limited, Kawasaki; PFU Limited, Ishikawa, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/912,237

(22) Filed: Aug. 15, 1997

(30) Foreign Application Priority Data

Mar. 7, 1997 (JP) .................................................. 9-053693

(51) Int. Cl.[7] ...................................................... G06F 9/00
(52) U.S. Cl. ............................................ 709/100; 709/102
(58) Field of Search .................................... 709/102, 105, 709/107, 100, 101, 104, 106, 108

(56) References Cited

U.S. PATENT DOCUMENTS

| 3,648,253 | * | 3/1972 | Mullery et al. ...................... 709/100 |
| 4,642,756 | * | 2/1987 | Sherrod ................................ 709/103 |
| 5,528,513 | * | 6/1996 | Vaitzblit et al. ...................... 364/514 |
| 5,619,499 | * | 4/1997 | Nakabayashi ........................ 370/469 |
| 5,640,563 | * | 6/1997 | Carmon ................................ 709/102 |
| 5,826,081 | * | 10/1998 | Zolnowsky ........................... 709/103 |

* cited by examiner

Primary Examiner—Majid Banankhah
(74) Attorney, Agent, or Firm—Staas & Halsey LLP

(57) ABSTRACT

An information processing apparatus is provided wherein execution request of each task is processed so that tasks having a certain sort of attribute are not executed in parallel and are executed sequentially without conducting any special operation. When a task instructed to be executed is a task which registered extensions, which are extensions registered in the category discriminating table, do not relate to, the information processing apparatus starts execution of the task without depending on execution condition of other tasks. When a task instructed to be executed is a task which registered extensions relate, the information processing apparatus starts execution of the task if a task which registered extensions relate is not under execution. On the other hand, if a task which registered extensions relate to is under execution, the information processing apparatus queues the execution instruction of the task and execute the queued task when the task which registered extensions relate to is completed.

22 Claims, 11 Drawing Sheets

FIG. 3

| EXTENSION |
|---|
| A V I |
| W A V |

FIG. 4

| TAKING OUT ORDER | TASK INFORMATION |
|---|---|
| 1 | xxxxxxx(yyy.WAV) |
| 2 | ... ... ... ... |
| 3 | ... ... ... ... |
|  |  |

FIG. 7

| EXTENSION | PRIORITY |
|---|---|
| AVI | 1 |
| WAV | 2 |

FIG. 8

| TAKING OUT ORDER | TASK INFORMATION | PRIORITY |
|---|---|---|
| 1 | xxxxxxx(yyy.AVI) | 1 |
| 2 | ………… | 1 |
| 3 | xxxxxxx(zzz.WAV) | 2 |
| 4 | ………… | 2 |
| | | |

FIG. 10

DATA IS PLAYED BACK. DESIGNATE THE QUEUING METHOD.

◎ QUEUING AT THE END OF THE QUEUE.

○ QUEUING BASED ON PRIORITY.

ACCEPTED

INFORMATION PROCESSING APPARATUS, MULTITASK CONTROL METHOD, AND PROGRAM RECORDING MEDIUM

BACKGROUND OF THE INVENTION

1. Field of the Invention

The present invention relates to an information processing apparatus having a function for executing a plurality of tasks in parallel, a multitask control method and a program recording medium stored with programs for making a computer to execute a plurality of tasks in parallel.

2. Description of the Related Art

In recent years, information processing apparatus capable of executing a plurality of tasks in parallel have been used in various fields. In such information processing apparatus (also called "multitask system"), there are cases that limitation may be imposed to the kinds of tasks which are executable in parallel depending on the hardware installed. However, it is configured, in principle, that a task may be added to a group of tasks to be executed in parallel every time a task is instructed by a user.

As described above, the conventional information processing apparatus are configured to instantly start a task which is instructed by a user to be executed. Accordingly, for example, when instructions are rendered to simultaneously execute a task to reproduce a video data file which includes motion-picture data and voice data, and is generally represented by an extension of file such as "AVI" or "MOV" representing data categories, and a task to reproduce a voice data file represented by an extension "WAV," as a result of the tasks being executed in parallel as schematically shown in FIG. 12, disadvantages such as followings arise:

(1) When the reproduction of a first video data (extension "AVI") and the reproduction of a second video data (extension "AVI") are instructed to be executed in parallel, a load on a processing circuit such as a CPU for processing video data is increased, and a processing speed thereof is lowered, so that the motion of the picture becomes not smooth. As a result, a user suffers a problem that it is difficult to see what kind of the motion picture is reproduced.

(2) When the reproduction of a first video data (extension "WAV") and the reproduction of a second video data (extension "WAV") are instructed to be executed in parallel, one voice data is interrupted to be reproduced in the middle of the reproduction, and then another voice data starts to be reproduced when a reproduction circuit (a sound circuit) cannot reproduce more than one voice data at a time. That is, the obtained result of the execution is against a user's intention to reproduce and listen to the voice data, respectively. Also, in case that the reproduction circuit can simultaneously reproduce a plurality of voice data, since the voice data are mixedly reproduced, the user is difficult to recognize what kind of voice data is reproduced.

(3) When the reproduction of a video data (extension "AVI") and the reproduction of a voice data (extension "WAV") are instructed to be executed in parallel, the reproductions of the voice data included in the video data and the voice data are effected under the condition of the above item (2). As a result, either situation is arisen where an execution result which is against the user's intention is obtained or it is difficult to recognize what kind of voices are reproduced.

As described above, executions of tasks in parallel to reproduce the motion-picture data (or a video data) and the voice data which are time sequence data cause a large load on the CPU and also affect the processing by other applications. Furthermore, since the execution result interferes with the user's sense, it causes the user's to be difficult to recognize the reproduced contents.

In the conventional information processing apparatus, in order to prevent such phenomena from occurring, as schematically shown in FIG. 13, it is required for the user to perform a job such as to instruct execution of a next task again after completion of each task (or after interrupting each task by operating an input apparatus such as a mouse and a keyboard).

SUMMARY OF THE INVENTION

In view of the above circumstances, the present invention has been made, and therefore has an object of the invention to provide an information processing apparatus capable of executing tasks sequentially with respect to tasks having a sort of attribute and, in addition, is capable of executing tasks in parallel with respect to tasks without such attribute as general multitask systems do. Further, another object of the invention is to provide an information processing apparatus capable of executing tasks in parallel without imposing a load on a processing circuit while preventing hindrance of a user's understanding.

To achieve the objects described above, in the present invention, an information processing apparatus is comprised of a first discrimination portion for discriminating the categories of generated tasks which are tasks generated, and a controlling portion for changing the timing of starting execution of generated tasks by a parallel execution portion executing tasks in parallel in accordance with the categories of the generated tasks discriminated by the first discrimination portion.

Accordingly to an information processing apparatus of the present invention having such construction, execution timing of a generated task (for example, a task instructed by a user to be executed) is changed in accordance with its category. Therefore, each generated task is effected in parallel or sequentially in consideration of the category of the task without requiring user's special operation. For this reason, it is possible to reproduce a data which is not desired to be reproduced simultaneously with its timing of starting execution shifted if, for example, a task whose timing of starting execution is changed is set as a task to reproduce a time sequential data such as image data and voice data.

When an information processing apparatus according to the present invention is formed, it is desirable to add a second discrimination portion for discriminating the categories of tasks executed by a parallel execution portion at the time of generating generated tasks and, at the same time, to employ as a control portion a portion which changes the timing of starting execution of generated tasks by a parallel execution portion in accordance with the category of a task under execution to be discriminated by the second discrimination portion and the category of a generated task discriminated by the first discrimination portion. An information processing apparatus employing such a construction makes it possible to execute each generated task in parallel or sequentially in consideration of the contents of tasks being executed at the time of generating tasks.

Further, when an information processing apparatus according to the present invention is formed, it is also possible to add a conditional data holding portion for classifying tasks into a first sort of tasks which are started to be executed without any conditions and a second sort of tasks whose timing of starting execution is changed and, at the same time, to employ a portion which determines the timing of starting execution of generated tasks by a parallel execution portion.

Further, when the timing of starting execution of generated tasks by a parallel execution portion is changed, it is also possible to employ a portion as a control portion to make the timing after completion of execution of predetermined categories of tasks executed by the parallel execution portion. When such a control portion is employed, an information processing apparatus which sequentially executes tasks having a certain attribute among generated tasks without requiring user's special operation can be obtained.

Further, when a priority data holding portion which holds priority data relating a plurality of categories and priority is added and a plurality of generated tasks whose timing of starting execution should be controlled exist, an information processing apparatus may be formed employing a portion which determines the order of starting execution of those generated tasks by a parallel execution portion in accordance with the priority related to the categories of each generated task in the priority data.

Still further, when an information processing apparatus having such construction is formed, if a plurality of generated tasks whose timing of starting execution should be controlled exist, it is also possible to employ as a control portion a portion having a function of determining the order of starting execution of those generated tasks by a parallel execution portion in accordance with the order of generation of those generated tasks and to add to the control portion a selection portion for selecting whether or not to determine in accordance with the order of generation.

Yet further, a multitask control method according to the present invention are provided with a first discriminating step in which categories of generated tasks which are tasks generated are discriminated and a control step in which the timing of starting execution of generated tasks by a parallel execution portion for executing tasks in parallel is changed in accordance with the category of the generated tasks discriminated in the first discriminating step.

When a multitask control method according to the present invention is used, it is desirable to incorporate a second discriminating step which discriminates categories of tasks being executed by a parallel execution portion at the time of generation of generated tasks and to employ as a control step a step of changing the timing of starting execution of the generated tasks by the parallel execution portion in accordance with the category of the tasks under execution which are discriminated in the second discriminating step and the category of the generated tasks discriminated in the first discriminating step.

Further, it is possible to employ as a control step a step of determining the timing of starting execution of generated tasks by a parallel execution portion using conditional data for discriminating tasks into the first sort of tasks which are started to be executed without any conditions and the second sort of tasks whose timing of starting execution is changed.

Further, when the timing of starting execution of generated tasks by a parallel execution portion is changed, it is also possible to employ as a control step a step for making the timing after completion of predetermined categories of tasks executed by the parallel execution portion.

Still further, if a plurality of generated tasks whose timing of starting execution should be controlled exist, it is also possible to employ as a control step a step for determining the order of starting execution of those generated tasks by a parallel execution portion in accordance with the priority related to categories of each generated tasks in the priority data relating categories of tasks and priority.

Furthermore, if a plurality of generated tasks whose timing of starting execution should be controlled exist, it is also possible to employ a step which also enables a processing to determine the order of starting execution of those generated tasks in accordance with the order of generation of those generated tasks and to add a selection step for selecting whether or not the order is determined in accordance with the priority data or in accordance with the order of generation in the control step.

BRIEF DESCRIPTION OF THE DRAWINGS

Other objects and advantages of the present invention will become apparent during the following discussion in conjunction with the accompanying drawings, in which:

FIG. 3 is an explanatory drawing of category discriminating table used at the time of task acceptance processing shown in FIG. 2;

FIG. 4 is an explanatory drawing of a queue table used at the time of task acceptance processing shown in FIG. 2;

FIG. 7 is an explanatory drawing of a category discriminating table used in the information processing apparatus in a second preferred embodiment of the invention;

FIG. 8 is an explanatory drawing of a queue table used in the information processing apparatus in the second preferred embodiment of the invention;

FIG. 10 is an explanatory drawing of a queuing method selection menu displayed at the time of task acceptance processing shown in FIG. 9;

DETAILED DESCRIPTION OF THE PREFERRED EMBODIMENT

Preferred embodiments of the present invention will now be described with reference to the accompanying drawings.

First Embodiment

Figure 1:
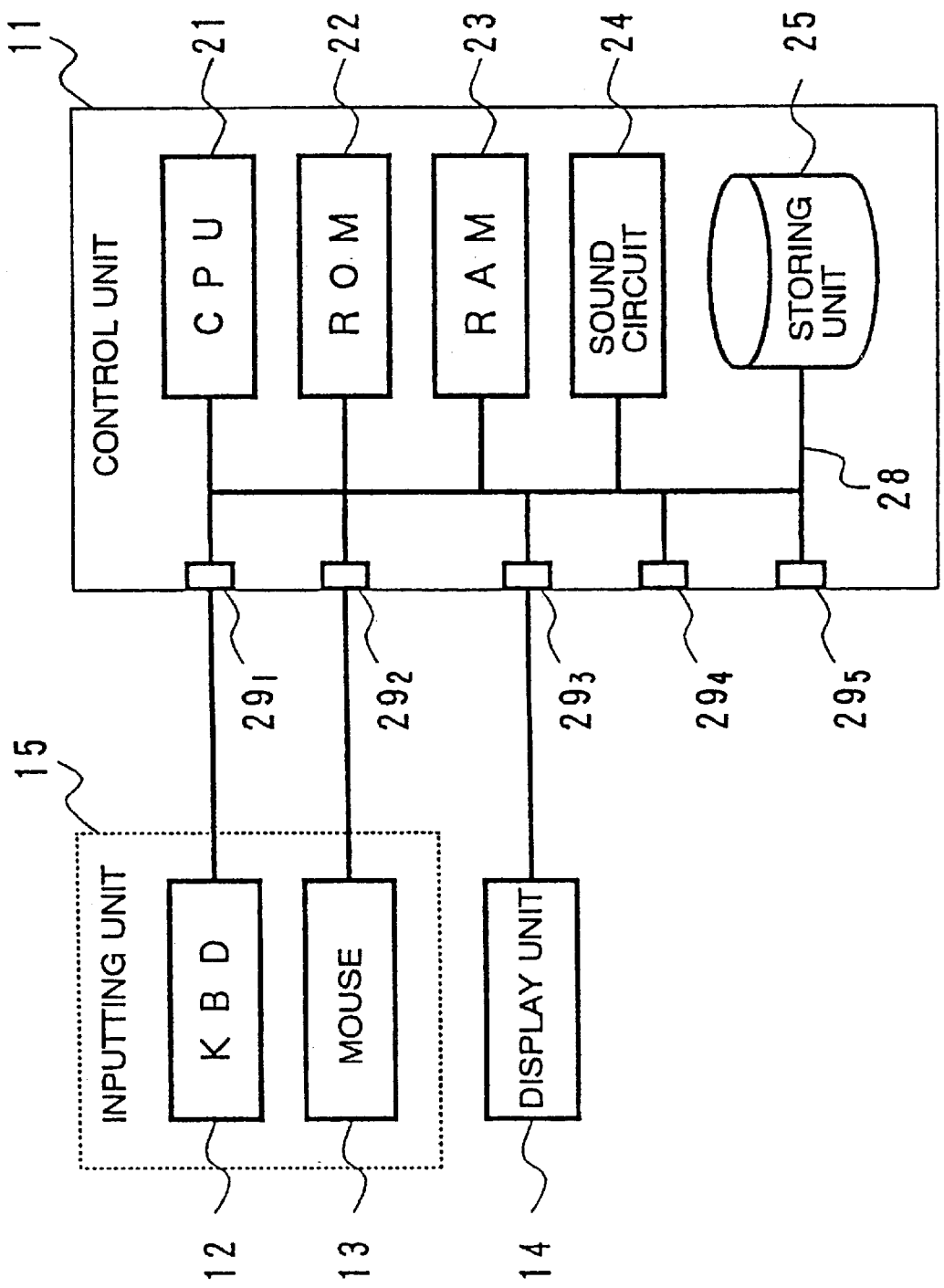
FIG. 1 is a block diagram showing a construction of an information processing apparatus in a first preferred embodiment of the invention.

FIG. 1 shows the construction of an information processing apparatus of the first preferred embodiment. As shown in the drawing, the information processing apparatus according to the present invention consists of a control unit 11, a keyboard (KBD) 12, a mouse 13 and a display unit 14. The control unit 11 has a CPU (central processing unit) 21, a ROM (read only memory) 22, a RAM (random access memory) 23, a sound circuit 24, a storing unit 25 and interface circuits $29_1$–$29_5$ as main construction elements. As shown in the drawing, each part of the control unit 11 is interconnected by a bus 28, and the keyboard 12, the mouse 13, the display unit 14 are connected to interface circuits $29_1$–$29_3$, respectively in the control unit 11.

The KBD 12 and the mouse 13 are equipment used by a user of the information processing apparatus according to the present invention to input various kinds of commands and data. The portion consisting of the KBD 12 and the mouse 13 is referred to as an inputting unit 15. The display unit 14 displays images corresponding to signals supplied from the control unit 11 (interface circuit $29_3$). A so-called CRT (cathode ray tube) display is used as the display unit 14 in the information processing apparatus according to the present invention.

The interface circuits $29_1$–$29_5$ are circuits for realizing data transfer between each portion in the control unit 11 (mainly the CPU 21 and the RAM 23) and the external equipment. Each interface circuit $29_i$ (i=1–5) has a configuration and function corresponding to the objective external equipment. For example, an interface circuit $29_3$ for the display unit 14 is provided with a VRAM (video RAM) for storing image data and outputs signals corresponding to image data in the VRAM to the display unit 14. Further, interface circuits $29_4$ and $29_5$ whose objective external equipment is not shown in the drawings are circuits for exchanging data with printers and other information processing apparatuses, respectively.

The storing unit 25 consists of a hard disk drive, a floppy disk drive and a CD-ROM (compact disk ROM) drive. The information processing apparatus according to the present invention is usually operated in such a condition that an operating system, various application programs working on the operation system and data (text data, motion-picture data or video data consisting of motion-picture and voice, voice data, etc.) utilized by application programs are stored in the hard disk. The floppy disk drive and the CD-ROM drive are the equipment for reading out programs and data stored in floppy disks and CD-ROMs, respectively, and installation of programs and storage of data in the hard disk are conducted utilizing the equipment or the interface circuit $29_5$ and the above-mentioned operating system is also installed in this manner. In addition, the floppy disk drive and the CD-ROM drive are also used as data sources to the application programs.

The sound circuit 24 is a circuit for producing sounds (voice, music) and is provided with a memory for holding voice data in which sounds to be produced are defined. The sound circuit 24 receives a part or all of voice data from the storing unit 25 (or RAM 28) through the bus 28. Then, the sound circuit 24 stores the received voice data in the memory and conducts processing of outputting sounds in time sequence corresponding to voice data on the memory. A circuit capable of producing sounds in parallel corresponding to voice data of a plurality of kinds of files represented by extensions such as "WAV" and "MOV" is used as the sound circuit 24 in the information processing apparatus according to the present invention.

The CPU 21 is a control circuit which controls the above-mentioned portions comprehensively. When power is on, the CPU 21 reads an operating system in the hard disk drive into a predetermined storage area in accordance with a boot strap loader stored in the ROM 22. Then, the CPU 21 makes the information processing apparatus according to the present invention work as a multitask system by controlling each portion in accordance with the operating system which has been read in.

A control procedure for executing in parallel a plurality of tasks defined by the operating system is the same as the one used in the general multitask system. In addition, a procedure for acquiring information concerning tasks to be executed is the same as the one used in the regular multitask system.

In other words, the CPU 21 produces a sort of table (hereinafter referred to as the task management table) for controlling tasks being executed in parallel on the RAM 23 and, if a task which is required to start execution arises, the CPU 21 registers task information (consisting of a program name and data distinguishing information which should be used by the program), i.e., information concerning the task, on the task management table. Then, the CPU 21 executes a plurality of tasks in parallel by assigning necessary resources such as the sound circuit 24 if data is a voice data and the display unit 14 if data is a video data to each task whose task information is registered in the task management table.

Further, the CPU 21 provides a user with various kinds of means for inputting task execution instructions. These means includes those by icons and, when an operation which represents selection of an icon for task execution instruction displayed on the screen of the display unit 14 is conducted in the inputting portion 15, the CPU 21 obtains task information corresponding to the icon as information representing the contents of a task which should be executed. In addition, if a signal from the inputting unit 15 is the one equivalent to so-called command input, the CPU 21 also obtains information represented by the signal as task information.

Conventional multitask systems were configured for task information obtained in the above-mentioned procedures to be instantly registered in the task management table. That is, tasks instructed by a user to be executed were instantly executed in conventional multitask systems whatever the task was.

On the contrary, the information processing apparatus according to the present invention is configured to respond to an instruction in a procedure corresponding to the sort of the task instructed to be executed (category of data to be handled by the task) as described below.

Figure 2:
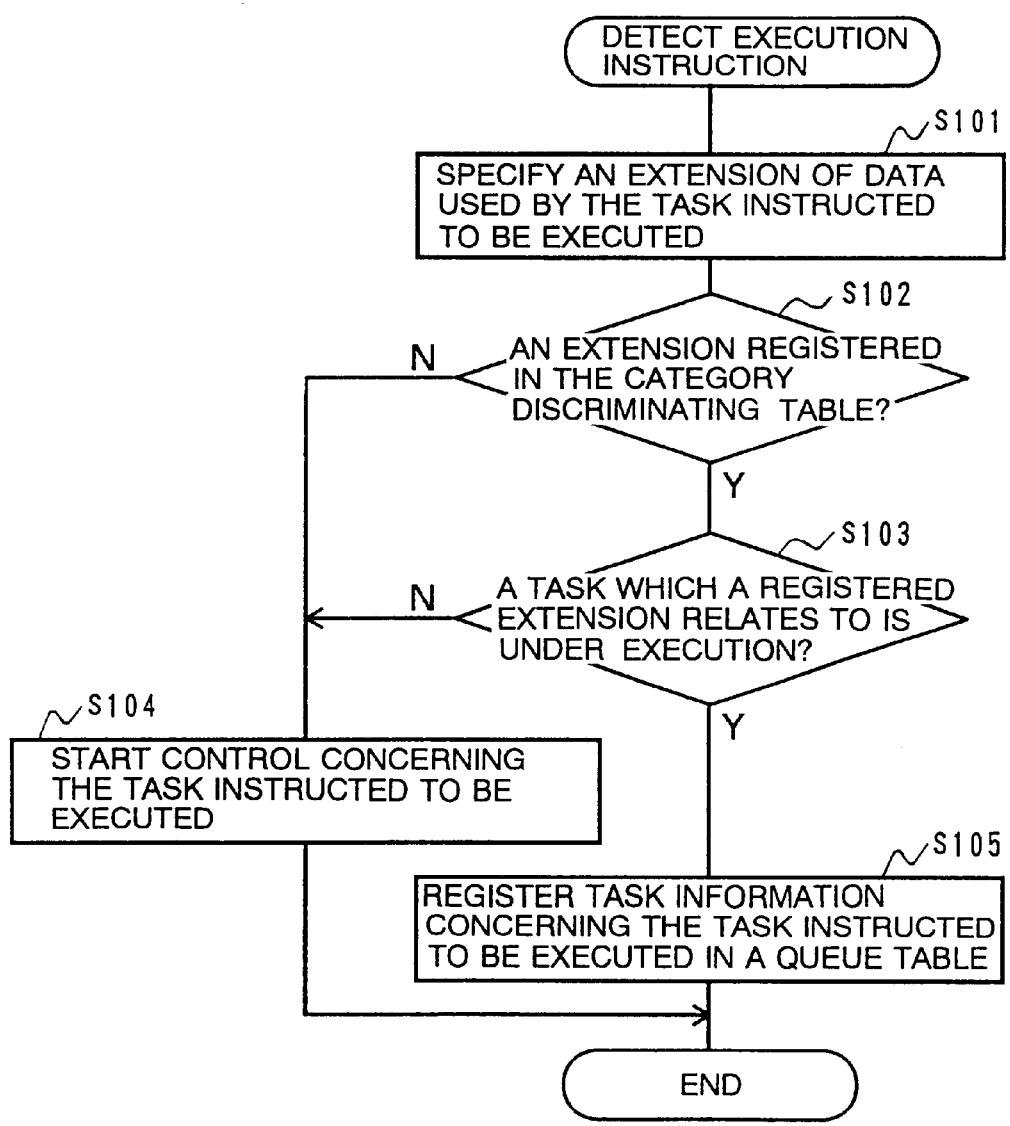
FIG. 2 is a flow chart of task acceptance processing conducted in the information processing apparatus in the first preferred embodiment of the invention.

First, explanation is made to task acceptance processing which the CPU 21 executes when it detects the input of task execution instruction with reference to FIG. 2 to FIG. 4. Further, among these figures, FIG. 2 is a flow chart showing working procedure of the CPU 21 at the time of task acceptance processing and FIG. 3 and FIG. 4 are explanatory drawings of a category distinguishing table and a queue table utilized by the CPU 21 at the time of task acceptance processing respectively.

As shown in FIG. 2, the CPU 21 specifies extensions included in discriminating information of data used by a task which is instructed to be executed (step S101) if it detects that the task execution is instructed (if it obtains task information concerning the task which is instructed to be executed). Then, the CPU 21 determines whether or not the specified extensions are those registered in the category distinguishing table (step S102).

As shown in FIG. 3, the category discriminating table is the table for storing (registering) several extensions. The category discriminating table is the table whose contents are set by a user and the user registers several extensions in the category distinguishing table by starting up the program for renewing the category distinguishing table included in the operating system prior to the operation of the information processing apparatus according to the present invention (in the category discriminating table as shown in the figure, extension "AVI" for discriminated information of the motion-picture data or the video data consisting of motion-picture data and voice data as well as extension "WAV" for discriminated information of voice data are registered).

Further, the program for renewing the category discriminating table is the one for generating the category discriminating table in the hard disk drive as well as for storing the copy of the table on the RAM 23. Further, procedures are defined in the operating system itself for reading out the contents of the category distinguishing table stored in the hard disk drive upon starting-up and storing the copy thereof on the RAM 23 and the CPU 21 conducts the determination of the step S102 using the data held on the RAM 23.

As shown in FIG. 2, the CPU 21 starts the control concerning the task which is instructed to be executed (step S104) if a specified extension is the one not registered in the category discriminating table (step S102; N). That is, the CPU 21 starts the control concerning the task by registering the task information concerning the task which is instructed to be executed. Then, the CPU 21 completes the task accepting processing and shifts to the ordinary condition (the condition in which the parallel control of tasks whose task information is stored in the task management table and the watching of inputs for instructing new task executions are conducted in parallel).

On the other hand, the CPU 21 judges whether or not the task using the data to which the discriminating information having extensions registered in the category discriminating table is assigned (hereinafter referred to as the task to which registered extensions are related) is under execution (step S103) by referring to the task management table if the specified extension is the one registered in the category discriminating table (step S102; Y).

The CPU 21 starts the control concerning the task which is instructed to be executed (step S104) in the same manner as in the case where execution instruction for the task whose registered extension is not related is input and completes the task acceptance processing if the task whose registered extension is related is not under execution (step S103; N). On this contrary, the CPU 21 completes the task acceptance processing after registering the task information concerning the task which is instructed to be executed in the queue table (step S105) if the task whose registered extension is related is under execution (step S103; Y).

As schematically shown in FIG. 4, the queue table is the one for storing a plurality of pieces of task information by relating the information to the taking out order. Further, the queue table is formed on the RAM 23 by the CPU 21.

In step S105 of FIG. 2, the CPU 21 registers task information in the queue table so that, if the number of pieces of task information registered in the queue table at that point is I (I is an integral number equal to or larger than 0), the taking out order of I+1 will be given to the task information which is the object of registration.

Thus, tasks which are instructed to be executed are classified into tasks which registration extensions do not relate to (hereinafter referred to as the first category task) and tasks which registration extensions relate to (the second category task) in the task acceptance processing corresponding to the contents of the category discriminating table. Then, when a task which is instructed to be executed is the one classified into the first category task, execution of the task is started without depending on execution of other tasks.

Further, when a task which is instructed to be executed is the one classified into the second category task, confirmation of execution conditions of other tasks is conducted. Then, if the task which is classified into the second category task is not under execution, control concerning the task which is instructed to be executed is started. On the other hand, if another task which is classified into the second category task is under execution, task information concerning the task which is instructed to be executed is registered in the queue table. That is, when the task which is instructed to be executed is the one which is classified into the second category task, the CPU 21 shifts to the condition in which parallel control of a task whose task information is stored in the task management table and watching of execution instruction input of a new task are conducted in parallel after conducting only registration of task information in the queue table without starting control concerning the task which is instructed to be executed if another task which is classified into the second category task is under execution.

Next, explanation is made of execution waiting task management processing which is processing for starting control of tasks corresponding to task information registered in the queue table.

Figure 5:
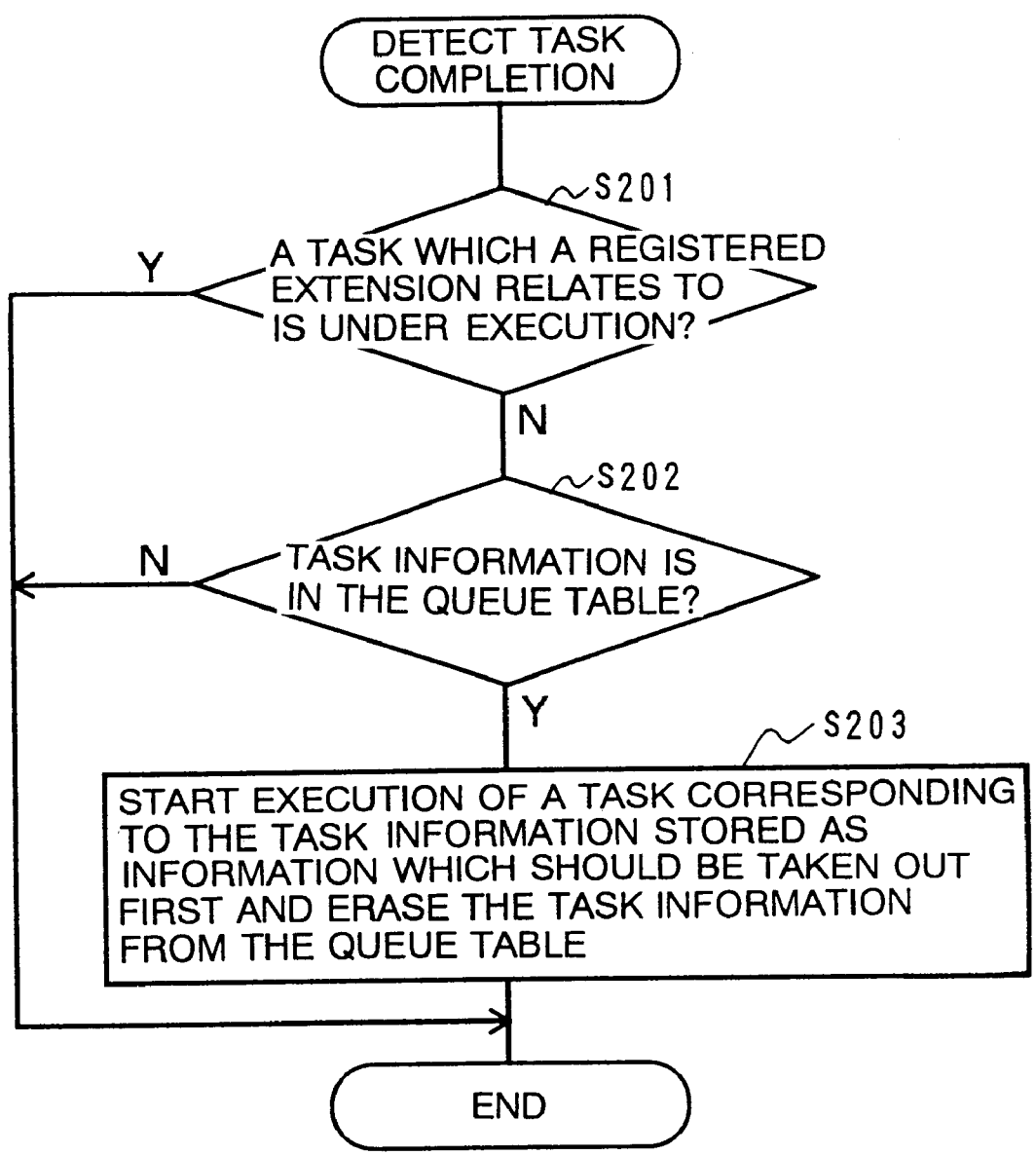
FIG. 5 is a flow chart of execution waiting task management processing conducted in the information processing apparatus in the first preferred embodiment of the invention.

Operation procedure of the CPU 21 at the time of execution waiting task management processing is shown in FIG. 5. Further, the execution waiting task management processing is the processing which is started when execution of tasks is completed, for example, when a task is automatically completed or cancellation instruction of a task is input by a user using the inputting unit 15.

As shown in the figure, when execution waiting task management processing is started, the CPU 21 judges at first whether or not a task which registration extensions (extensions registered in the category discriminating table) relate to (a task classified into the second category task) is under execution by referring to the task management table (step S201). Then, if a task which registration extensions relate to is under execution (step S201; Y), the CPU 21 completes the execution waiting management processing without accessing the queue table and shift to the ordinary condition (the condition in which the parallel control of tasks and the watching of inputs for instructing task execution are conducted in parallel).

On the other hand, if a task which registration extensions relate to is not under execution (step S201; N), the CPU 21 judges whether or not task information is registered in the queue table (step S202). Then, if the task information is registered (step S202; Y), the CPU 21 starts execution of a task corresponding to the task information stored in the queue table as information in order to be taken out first and at the same time, erases information concerning the task information from the queue table (step S203) and completes the execution waiting management processing. Further, if the task information is not registered (step S202; N), the CPU 21 completes the execution waiting task management processing without conducting any specific processing.

Thus, if a task classified into the second category task is not under execution when a certain task is completed (that is, when a task classified into the second category task is completed), the CPU 21 in the information processing apparatus according to the present invention takes out task information concerning the task whose execution was instructed in the most remote past to register it in the task management table and starts control concerning a task corresponding to the task information.

As described above, a task using the data having extensions registered in the category discriminating table (a task classified into the second category task) is controlled so that more than one task is not executed simultaneously in the information processing apparatus according to the present invention. Further, execution instruction of another task classified into the second category task which is input during execution of a task classified into the second category task is queued. Then, when execution of the second category task is completed, execution of the queued task (the second category task) is started.

In other words, execution request is processed so that a task classified into the second category task is not executed in parallel and is executed sequentially in the order of execution instruction with whatever procedures execution instruction concerning a task classified into the second category task is carried out.

Figure 6:
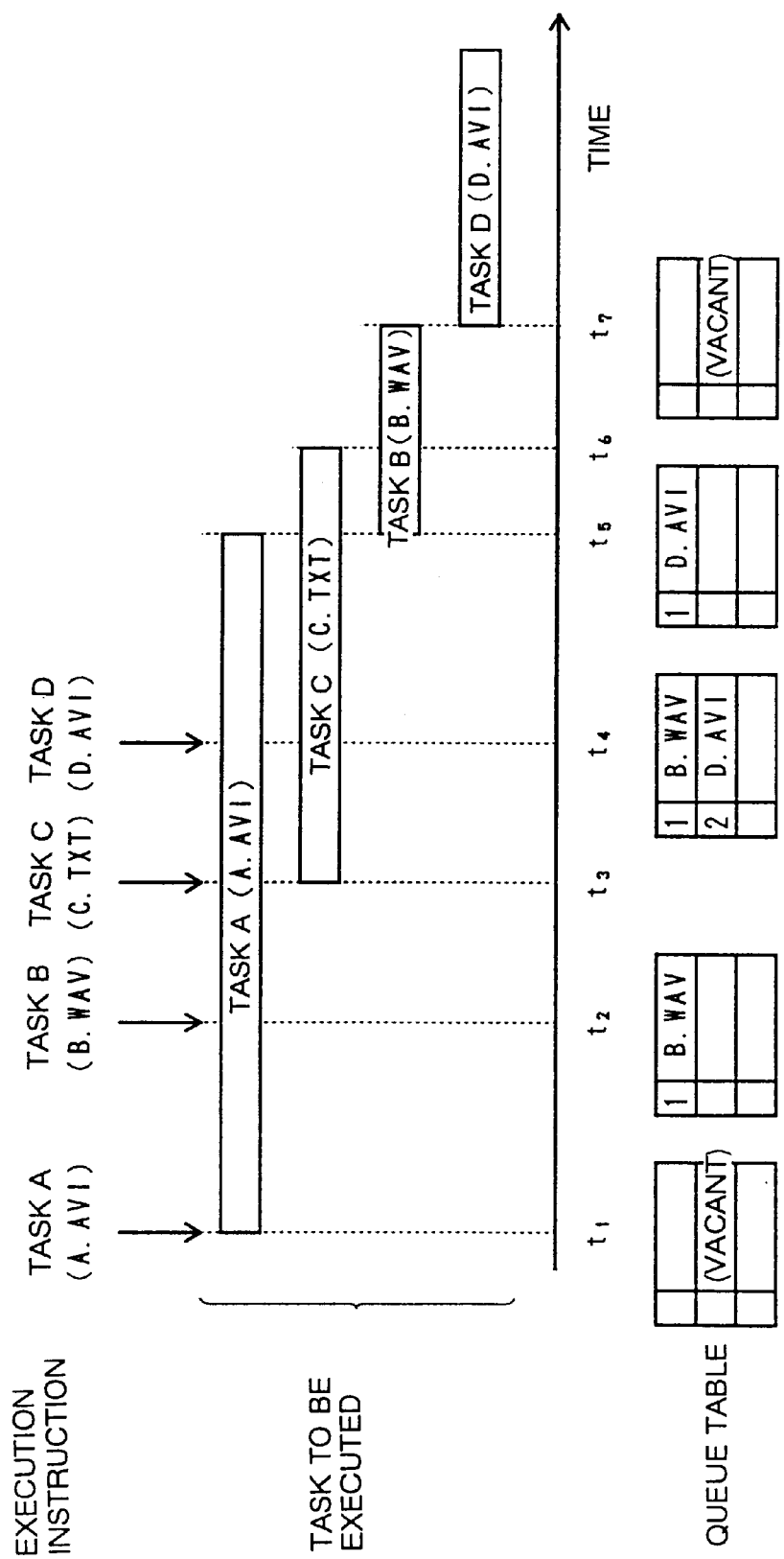
FIG. 6 is an explanatory drawing showing answering procedures to execution instructions of tasks of the information processing apparatus in the first preferred embodiment of the invention provided with a category discriminating table shown in FIG. 3.

For example, under the condition that the category discriminating table shown in FIG. 3 is set, if execution of the tasks B, C, D, which reproduce the voice data B. WAV, the text data T. TXT, the motion-picture data or the video data D. AVI consisting of motion-picture and voice, respectively, is instructed in this order after execution of the task A which reproduces the motion-picture data or the video data A. AVI consisting of motion-picture and voice is instructed and before completion of the task A, the information processing apparatus operates as schematically shown in FIG. 6. Further, execution instruction of the task A is shown as rendered when tasks are not executed in FIG. 6.

First, the case that execution instruction of the task A which reproduces the motion-picture data or the video data A. AVI consisting of motion-picture and voice is input at the time t, is considered. In this case, since the task A is a task classified into the second category task (the extension "AVI" registered in the category discriminating table (FIG. 3) is included in the discriminating information of data "A. AVI"), it is judged whether or not a task classified into the second category task is under execution in the information processing apparatus. Since it is detected that a task classified into the second category task is not under execution, execution of the task A (reproduction of the motion-picture data or the video data A. AVI consisting of motion-picture and voice) is started.

Then, when execution instruction of the task B which reproduce the voice data B. WAV is input at the time $t_2$, since the task B is a task classified into the second category task, it is judged whether or not a task classified into the second category task is under execution as it is at the time of inputting execution instruction of the task A. In this case, since the task A classified into the second category task is under execution, control concerning the task B is not started and the task information of the task B is registered in the queue table as shown in the figure. Further, the queue table in the figure only shows the taking out order and the discriminating information of data.

Further, when execution of the task C which reproduce the text data C. TXT is instructed at the time $t_3$, since extension of data used by the task C is not registered in the category discriminating table, execution of the task C is started without any conditions. As a result, control of the task A and the task C is executed in parallel in the information processing apparatus after the time $t_3$.

Then, when execution instruction of the task D which reproduce the motion-picture data or the video data D. AVI consisting of motion-picture and voice is input at the time $t_4$, since the task D is a task classified into the second category task, it is judged whether or not tasks classified into the second category task are under execution is determined in the information processing apparatus. Since the task A classified into the second category task is under execution, control concerning the task D is not started and the task information of the task D is registered in the queue table as the information to be taken out secondly (after the task information concerning the task B).

Then, when the task A is completed in the task A at the time of the time $t_5$, execution waiting task management processing is conducted. In this case, a task under execution is the first category task (the task C) only and tasks classified into the second category task are not executed. Therefore, execution of the task B which corresponds to the task information registered in the queue table as the task to be taken out first is started and the task information concerning the task B is deleted from the queue table.

Further, when the task C is completed at the time $t_6$, execution waiting task management processing is conducted as well. However, since the task B classified into the second category task is under execution at this point, the information processing apparatus (CPU 21) completes the execution waiting task management processing without taking out the task information from the queue table.

As shown in the figure, the task information concerning the task D in the queue table is taken out from the queue table and is started to be executed by execution waiting task management processing which is conducted when the task B classified into the second category task is completed.

As described above, when extensions of data are set in the category discriminating table so that the task concerning reproduction of the voice data or the motion-picture data or the video data consisting of motion-picture and voice are classified into the second category task, it becomes possible that each task which is a task of playing back data in time series is executed sequentially by successive input of reproduction requests of each data. Further, since tasks not classified into the second category task (task C in FIG. 6) are made so that they can be executed in parallel with other tasks as general multitask system is, display (or edit) of text data can be conducted while reproduction control of video data consisting of motion-picture data of video data including voice data and motion-picture or video data consisting of motionpicture and voice is conducted as mentioned above with the information processing apparatus according to the present invention.

Second Embodiment

An information processing apparatus of a second preferred embodiment of the invention is a variation of the information processing apparatus of the first preferred embodiment and its hardware construction is the same as the one shown in FIG. 1. Further, since its operation procedure is similar to the operation procedure of the information processing apparatus of the first preferred embodiment, construction and operation of an information processing apparatus of the second preferred embodiment is herein described centering on portions different from the information processing apparatus of the first preferred embodiment.

Constructions of the category discriminating table and the queue table used by the information processing apparatus of the second preferred embodiment are shown in FIG. 7 and FIG. 8 respectively. As shown in FIG. 7, the category discriminating table used by the information processing apparatus according to the present invention is a table which holds not only extensions but also priority which is made to correspond to each extension. Further, as shown in FIG. 8, the queue table is a table which stores priority in addition to task information and the taking out order of the information.

Figure 9:
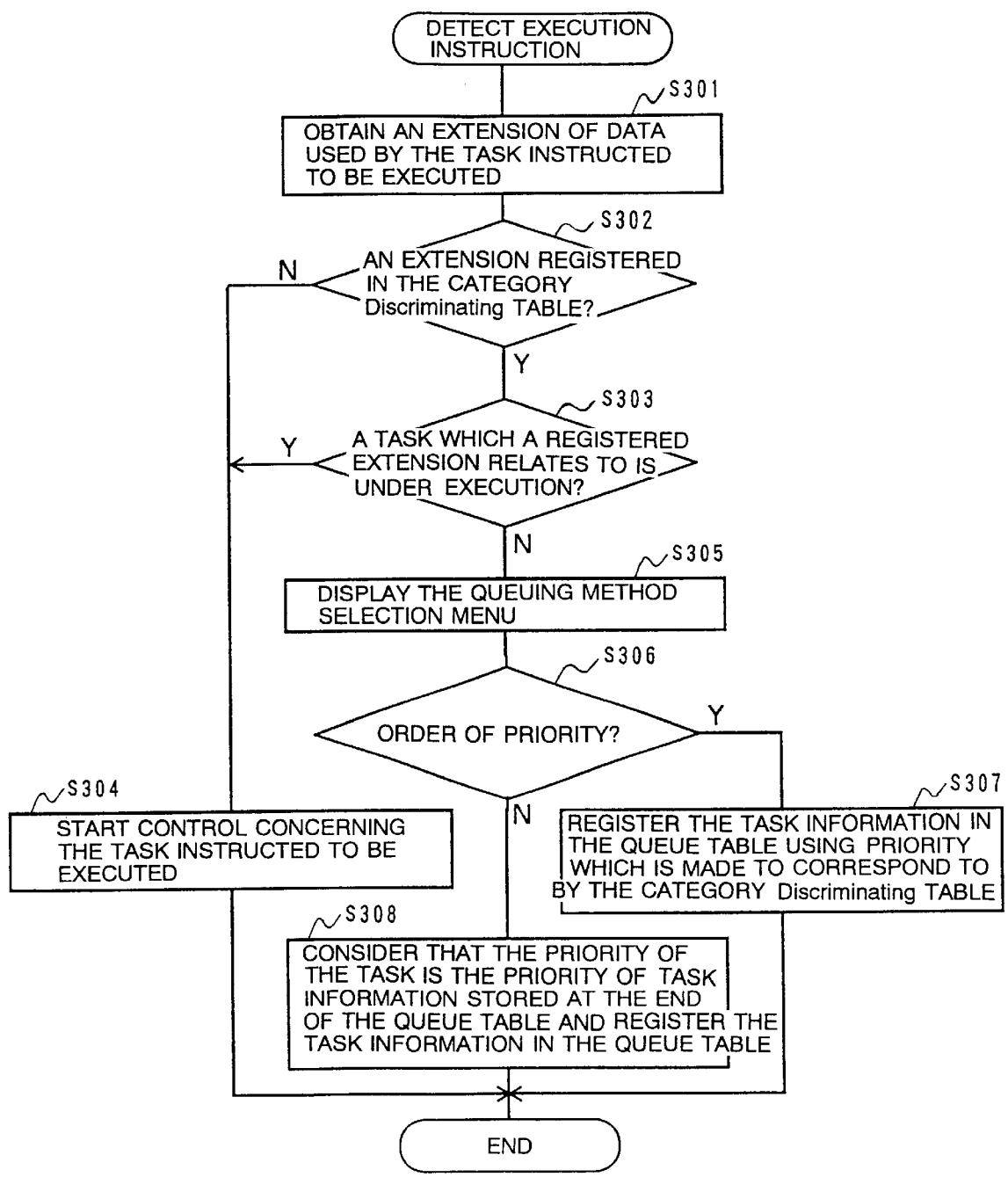
FIG. 9 is a flow chart of task acceptance processing conducted in the information processing apparatus in the second preferred embodiment of the invention.

The task acceptance processing in the information processing apparatus according to the present invention is conducted in accordance with the procedures shown in FIG. 9 using these tables. In steps S301 through S304 among the steps shown in the figure, same processing as in steps S101 through S104 of the task acceptance processing in the information processing apparatus of the first preferred embodiment (FIG. 2) is conducted. Therefore, description of these steps are omitted.

In the task acceptance processing in the information processing apparatus of the second preferred embodiment, a task instructed to be executed is a task which a registration extension (an extension registered in the category discriminating table) relates to (step S302; Y) and in addition, if a task which a registered extension relates to is under execution (step S303; Y), the following processing is conducted:

First, the CPU 21 displays a queuing method selection menu on the screen of the display unit 14 (step S305).

As shown in FIG. 10, the queuing method selection menu consists of a method for "queuing at the end of the queue" and a method for "queuing based on priority" and is a menu for selecting a queuing method to be actually used. A user selects either of the methods by operating the inputting unit 15 (mouse 13) in accordance with the predetermined operational procedures if this menu is displayed after inputting task execution instruction, and selects "Accepted". Further, the information processing apparatus according to the present invention (CPU 21) is configured so that it considers an item on which mouse cursor is positioned is selected when a mouse button is clicked.

As shown in FIG. 9, the CPU 21 specifies the queuing method selected by a user by watching the condition of signals from the inputting unit 15 after displaying the queuing method selection menu (step S306). Then, if the queuing based on priority is selected (step S306; Y), the CPU 21 registers the task information in the queue table so that, by using the priority which is made to correspond to the (data used by ) task instructed to be executed in the category discriminating table, the task information concerning the task instructed to be executed is taken out following the task information which is made to correspond to the same registered priority and is taken out prior to the task information which is made to correspond to the lower priority (larger in value) (step S307).

For example, as shown in FIG. 8, when the task information which is made to correspond to the priority "1" is registered in the queue table as the task information whose taking out order is the first and second and the task information which is made to correspond to the priority "2" is registered as the task information whose taking out order is the third and fourth, if the task information which the extension "AVI" relates to is registered, since the priority of the extension "AVI" is "1", the CPU 21 makes the task information taken out thirdly (following the two pieces of task information whose priority is "1") and renews contents of the queue table so that the taking out order of the task information whose taking out order is the third and fourth becomes the fifth and sixth.

After conducting registration of task information (step S307) in such a manner, the CPU 21 completes the task acceptance processing and shifts to the ordinary condition.

On the other hand, if the queuing based on the priority is not selected (step S306; N), that is, if "queuing at the end of the queue" is selected, the CPU 21 recognizes the priority concerning the task instructed to be executed is the priority of the task information stored at the end of the queue table (the task information whose taking out order is the last) and registers the task information in the queue table so that the task information concerning the task is taken out following the task information of the same priority (step S308). Further, if task information is not registered in the queue table, the CPU 21 considers the priority order of the task information is "1" and registers the task information in the queue table when it executes this step S308.

For example, when the queue table is in the condition as shown in FIG. 8, the CPU 21 recognizes that the priority of the task is "2" (priority of the fourth task information in the queue table), although the priority which is made correspond to "AVI" in the category discriminating table is "1", if it registers the task information which the extension "AVI" relates to. The CPU 21 then registers the task information in the queue table giving the priority "2" and taking out order "5". Further, when task information is not registered in the queue table, the CPU 21 recognizes that the priority of the task information is "1", although the priority which is made correspond to the task information in the category discriminating table is "2", when it registers task information which the extension "WAV" relates to, and registers the task information in the queue table.

Then, the CPU 21 completes the task acceptance processing and shifts to the ordinary condition after conducting registration of the task information in such a manner (step S308).

Since processing which is conducted to take out task information registered in the queue table in the information processing apparatus of the second preferred embodiment is completely the same as the execution waiting task management processing described with reference to FIG. 5, its description is omitted.

Figure 11:
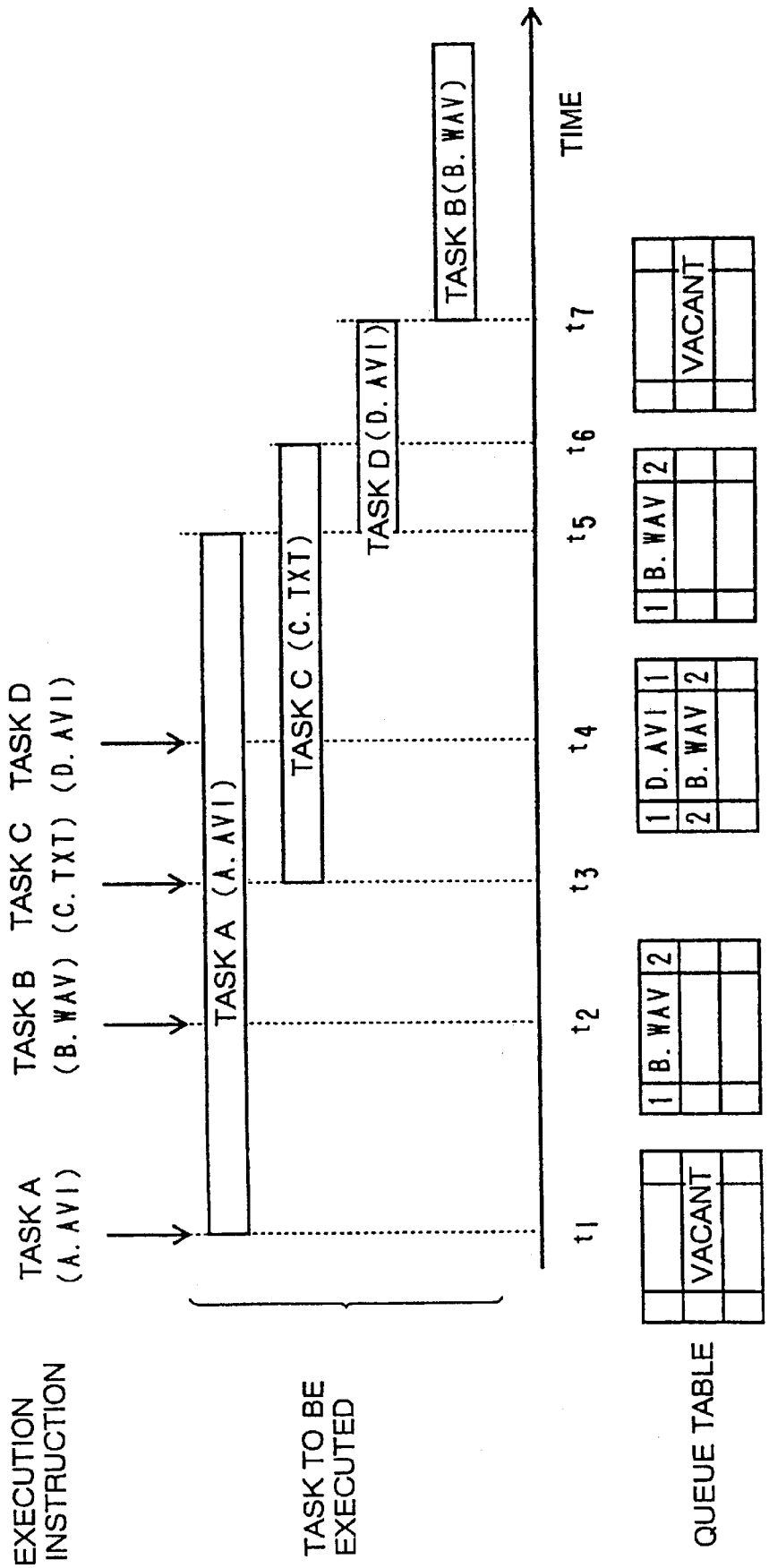
FIG. 11 is an explanatory drawing showing answering procedures to task execution instructions of the information processing apparatus in the second preferred embodiment of the invention provided with a category discriminating table shown in FIG. 7.
Figure 12:
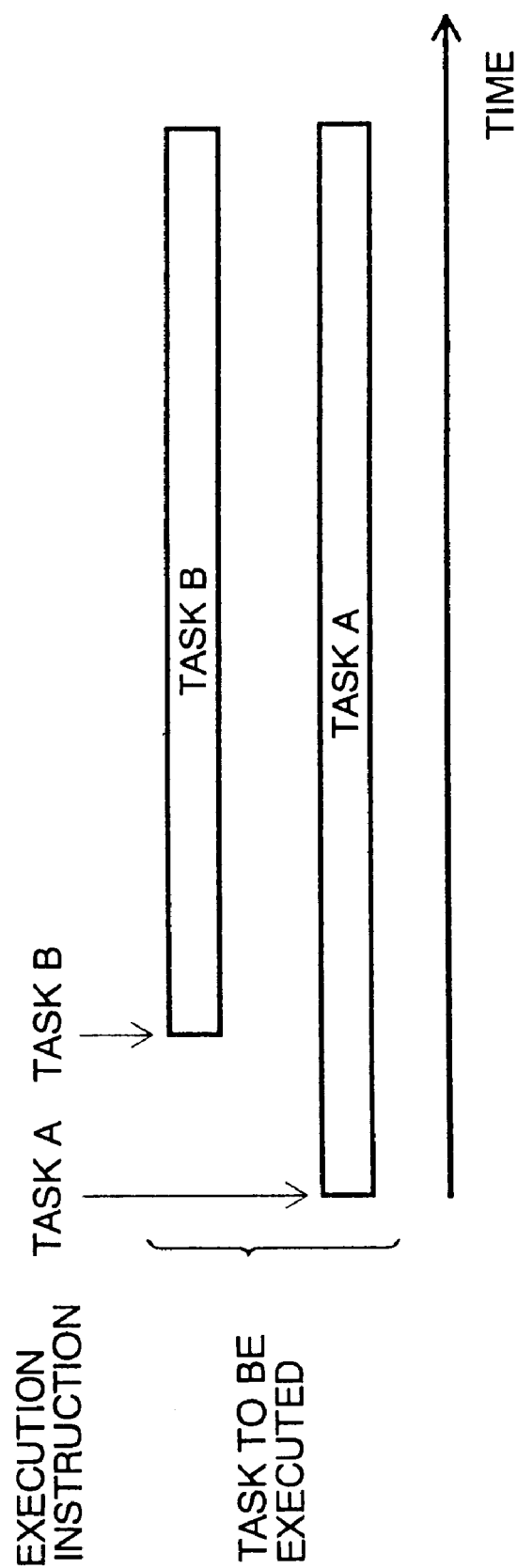
FIG. 12 is an explanatory drawing illustrating a first operation of a conventional information processing apparatus (multitask system)
Figure 13:
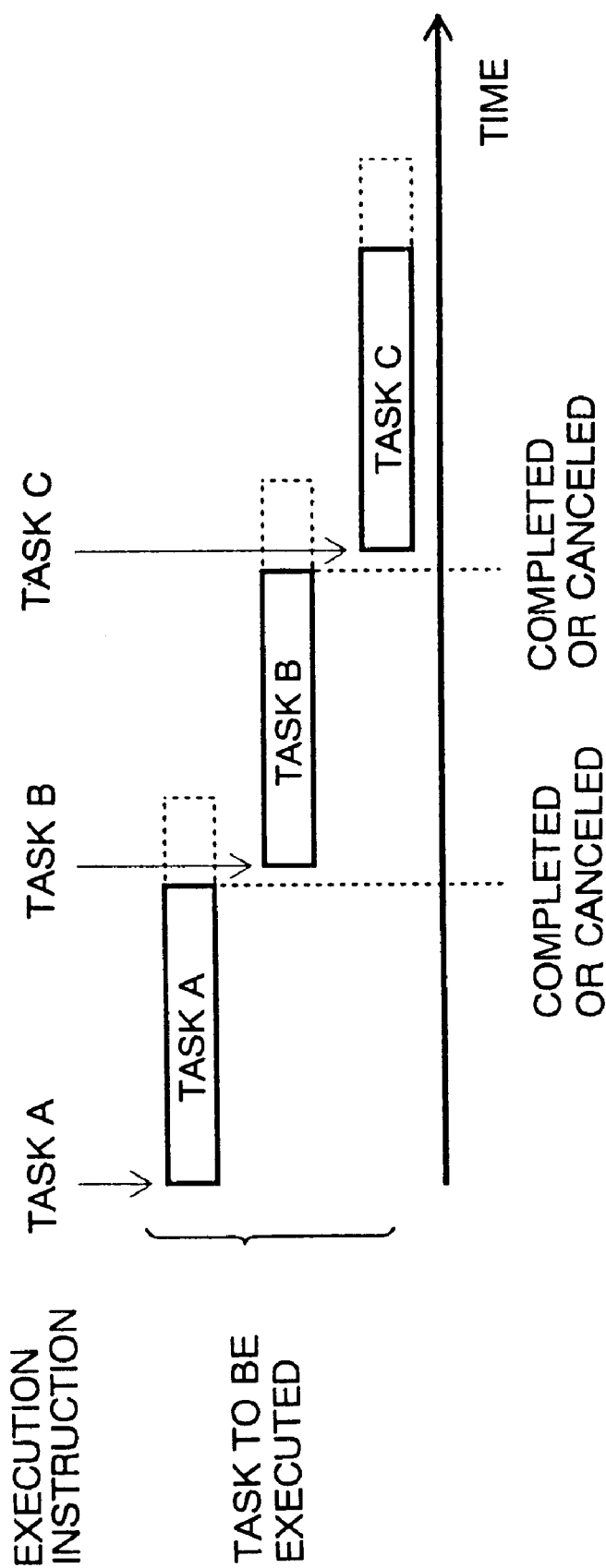
FIG. 13 is an explanatory drawing illustrating a second operation explanatory of the conventional information processing apparatus.

The operation procedures of the information processing apparatus of the second preferred embodiment which is configured as described above is now described more in detail with reference to FIG. 11. FIG. 11 is a drawing which schematically shows operation contents of the information processing apparatus in the case where execution instructions of the four tasks used for description in FIG. 6 are input in completely the same order when the category discriminating table shown in FIG. 7 is set in the information processing apparatus. Further, a method of "queuing based on priority" is considered to be selected every time the queuing method selection menu is displayed in FIG. 11.

When the execution instruction of the task A which reproduce the motion-picture data or the video data A. AVI consisting of motion-picture and voice is input at the time $t_1$, since the task A is a task classified into the second category task, it is judged whether or not a task classified into the second category task is under execution in the information processing apparatus. A task classified into the second category task is not executed at this point, execution of the task A (reproduction of the motion-picture data or the video data A. AVI consisting of motion-picture and voice) is started as shown in the figure.

Then, when the execution instruction of the task B which reproduce the voice data B. WAV is input at the time $t_2$, since the task B is a task classified into the second category task, it is judged whether or not a task classified into the second category task is under execution in the information processing apparatus similarly to at the time the execution instruction of the task A is input. In this case, since the task A classified into the second category task is under execution, task information concerning the task B is registered in the queue table and the queuing method selection menu is displayed. When the order of priority is selected, the task information of the task B is registered in the queue table which is made to correspond to the priority "2" concerning "WAV" designated in the category discriminating table (FIG. 7) as schematically shown in the figure.

Then, when the execution of task C which reproduce the text data C. TXT is instructed at the time $t_3$, since the extension used by the task C is an extension not registered in the category discriminating table, execution condition of other tasks is not confirmed and the execution of the task C is started.

Further, when the execution instruction of the task D which reproduce the motion-picture data or the video data D. AVI consisting of motion-picture and voice is input at the time $t_4$, since the task D is a task classified into the second category task and the task A classified into the second category task is under execution, the task information of the task D is registered in the queue table after the queuing method selection menu is displayed. On this occasion, since the priority which is made to correspond to the extension "AVI" is "1", the task information concerning the task D is registered in the queue table in the form as it is taken out before the task information concerning the task B.

When the task A is completed at the time $t_5$, the execution waiting task management processing is conducted. In this case, as a result of the completion of the task A which is a second category task, a task classified into the second category task is not under execution. Therefore, the task D which is a task corresponding to the first task information in the queue table is started and the task information concerning the task D is excluded from the queue table by the execution waiting task management processing.

Further, when the task C is completed at the time $t_6$, the execution waiting task management processing is conducted as well. However, since the task B classified into the second category task is under execution at this point, the information processing apparatus (CPU 21) completes the execution waiting task management processing without taking out the task information from the queue table.

The task information concerning the task B in the queue table is taken out from the queue table by the execution waiting task management processing which is conducted when the task D classified into the second category task is completed (time $t_7$) as shown in the figure.

As described above, a task classified into the second category task, which is a task executed sequentially, can also be executed in the predetermined order of priority according to the modified example of the information processing apparatus of the second preferred embodiment.

Although extensions are used as information for classifying tasks in the information processing apparatus of the first and the second preferred embodiments, the apparatus can be configured so that tasks are classified by information other than extensions such as program names. In this case, it is preferable that extensions as mentioned above are not registered but program names for rendering execution control is registered by a user in advance in a category discriminating table and the above mentioned processing is conducted by determining whether or not program names included in the task information of the task coincide with program names registered in the category discriminating table.

Further, the apparatus may be configured so that the first few bytes of files are prescribed as a data category area and video data and voice data, etc. are judged from the data category area of the files to be dealt in task execution. In addition, it may also be configured so that a management information file which shows data category corresponding to each file is prepared separately and data category corresponding to the file is obtained from the management information file based on the file name to be dealt in the task execution. That is, any methods may be taken as long as it is configured so that data category of files used in task execution can be distinguished.

Further, although the information processing apparatus of the second preferred embodiment is configured so that the menu for selecting a queuing method is displayed every time registration in the queue table is conducted, needless to say, the apparatus may be configured so that the processing of steps S305 and S306 is conducted separately from the processing shown in FIG. 9 and the processing of step S307 is instantly executed without displaying the queuing method selection menu if a branch to the "N" side is rendered.

The information processing apparatus of each preferred embodiment is an apparatus which realizes the control functions as mentioned above by installing a new operating system in a computer having the general construction. However, methods which can be employed for realizing the above mentioned control functions are not limited to these and an information processing apparatus equivalent to each preferred embodiment may be realized by preparing a program and data for making an existing operating system function as a system equivalent to the operating system of the preferred embodiments and incorporating the program and the data in the computer in which the ordinary operating system is installed. Further, it is also possible for an ordinary computer to have the above mentioned control functions when provided with an application program for rendering the above mentioned execution control based on the contents of data exchanges between an operating system and an application program which task execution is instructed to.

As described above, according to the present invention, an information processing apparatus may be obtained in which execution requests are processed so that tasks classified into the second category tasks are not executed in parallel and is executed sequentially if execution requests concerning the tasks classified into the second category task by conditional data are made in any procedure.

Further, an information processing apparatus may be obtained which is capable of preventing hindrance of a user's understanding and making tasks to be executed in parallel so that loads are not applied to processing circuits such as a CPU by, for example, making a task which reproduce time sequential data such as motion-picture data and voice data to be classified into the above mentioned second category task.

What is claimed is:

1. An information processing apparatus for a parallel processing system including a parallel execution unit, comprising:
   a first discrimination unit to discriminate categories of generated tasks; and
   a control unit to change an execution start time of the generated tasks by the parallel execution unit based on the categories of the generated tasks and whether competition for a reproducing device would exist between the generated tasks about to begin execution and currently executing tasks.

2. An information processing apparatus as claimed in claim 1,
   further comprising a second discrimination unit to discriminate the categories of tasks executed by the parallel execution unit when the generated tasks are generated, and
   wherein said control unit changes the execution start time of the generated tasks by the parallel execution unit in accordance with the category of a task under execution discriminated by said second discrimination unit and the category of the generated tasks discriminated by said first discrimination unit.

3. An information processing apparatus as claimed in claim 2,
   further comprising a conditional data holding unit to hold conditional data for classifying tasks into a first category task whose execution is started without any conditions and a second category task whose timing to start execution is changed, and
   wherein said control unit determines the timing for starting execution of the generated tasks by the parallel execution unit using the conditional data held in said conditional data holding unit.

4. An information processing apparatus as claimed in claim 3, wherein said control unit changes the timing for starting execution of at least one of the generated tasks by said parallel execution unit to occur after completion of a task of a predetermined category executed by the parallel execution unit.

5. An information processing apparatus as claimed in claim 4, further comprising:
   a storage unit to store a plurality of categories of tasks whose timing for starting execution is changed; and
   a priority data holding unit to hold priority data which relates the plurality of categories to priority, and
   wherein if a plurality of the generated tasks whose timing for starting execution should be controlled exist, said control unit determines an order of starting execution of the generated tasks by said parallel execution unit in accordance with the priority which is related to the category of each generated task in the priority data.

6. An information processing apparatus as claimed in claim 5,
   wherein if a plurality of said generated tasks whose timing for starting execution should be controlled exist, said control unit determines an order of starting execution of the generated tasks by the parallel execution unit in accordance with the order of generation of the generated tasks, and
   further comprising a selection to select whether to have said control unit determine the order of starting execution in accordance with the priority or in accordance with the order of generation.

7. An information processing apparatus as claimed in claim 1, wherein a task whose timing for starting execution is changed is a task which reproduces data in time sequence.

8. An information processing apparatus as claimed in claim 7, wherein the data in time series is at least one of image data and voice data.

9. A multitask control method, comprising:
   discriminating categories of generated tasks;
   determining whether each generated task about to begin execution would be in competition for a reproducing device being used by a currently executing task; and
   modifying an execution start time of the generated tasks by a parallel execution unit in accordance with the categories of the generated tasks and whether competition would exist between the generated tasks about to begin execution and currently executing tasks.

10. A multitask control method as claimed in claim 9,
    further comprising discriminating categories of the currently executing tasks executed by the parallel execution unit when the generated tasks are generated, and
    wherein said modifying includes changing the timing for starting execution of the generated tasks by the parallel execution unit in accordance with a category of a task under execution and a category of the generated tasks.

11. A multitask control method as claimed in claim 10, wherein said modifying includes determining the timing for starting execution of the generated tasks by the parallel execution unit using conditional data for classifying tasks into a first category task whose execution is started without any conditions and a second category task whose timing for starting execution is changed.

12. A multitask control method as claimed in claim 11, wherein when the timing for starting execution of the generated tasks is changed by the parallel execution unit, said modifying includes setting the execution start to after completion of a task of a predetermined category executed by the parallel execution unit.

13. A multitask control method as claimed in claim 12, wherein there are a plurality of categories of tasks whose timing for starting execution is changed and if a plurality of the generated tasks whose timing for starting execution should be controlled exist, said modifying includes determining an order of starting the generated tasks by the parallel execution unit in priority data which relates the category of a task to a priority in accordance with the priority related to the category of each generated task.

14. A multitask control method as claimed in claim 13,
    wherein if a plurality of the generated tasks whose timing for starting execution should be controlled exist, said modifying also includes determining the order of starting execution of the generated tasks by the parallel execution unit in accordance with an order of generation of the generated tasks, and
    further comprising selecting whether to have the order determined according to the priority data or according to the order of generation of the generated tasks.

15. A multitask control method as claimed in claim 9, wherein a task whose timing for starting execution is a task for playing back data in time sequence.

16. A multitask control method as claimed in claim 15, wherein the data in time series is at least one of image data and voice data.

17. A program recording medium storing a program to control a computer to perform a method comprising:

discriminating categories of generated tasks;

determining whether each generated task about to begin execution would be in competition for a reproducing device being used by a currently executing task; and changing an execution start of the generated tasks by a parallel execution unit corresponding to a category of the generated tasks and whether competition would exist between the generated tasks about to begin execution and currently executing tasks.

18. An information processing apparatus for a parallel processing system including a parallel execution unit and at least one reproducing unit, comprising:

a first discrimination unit to discrimination categories of generated tasks; and a control unit to change an execution start time of processing the generated tasks by the parallel execution unit based on the categories of the generated tasks and whether the generated tasks about to begin execution and would use the reproducing apparatus used by at least one currently executing task.

19. An information processing apparatus as recited in claim 18, wherein the at least one reproducing unit includes a sound circuit in said control unit.

20. An information processing apparatus as recited in claim 18, wherein the at least one reproducing unit includes a display unit coupled to said control unit.

21. An information processing apparatus as recited in claim 18, wherein said information processing apparatus includes multiple reproducing units of varying types, and wherein said control unit changes the execution start time of processing the generated tasks about to begin execution if any currently executing task is using any of the reproducing units.

22. An information processing apparatus as recited in claim 21, wherein the at least one reproducing unit further includes a sound circuit in said control unit and a display unit coupled to said control unit.

* * * * *